United States Patent [19]

Abo

[11] Patent Number: 5,177,770
[45] Date of Patent: Jan. 5, 1993

[54] LINEAR SCALE MEASURING DEVICE

[75] Inventor: Mituyosi Abo, Mobara, Japan

[73] Assignee: Futaba Denshi Kogyo K.K., Mobara, Japan

[21] Appl. No.: 758,692

[22] Filed: Sep. 12, 1991

[30] Foreign Application Priority Data

Sep. 17, 1990 [JP] Japan .................................. 2-246645

[51] Int. Cl.⁵ ........................... G01B 7/14; G01D 7/00
[52] U.S. Cl. ........................................ 377/24; 33/707; 33/755; 377/17
[58] Field of Search ...................... 377/17, 24; 33/707, 33/755

[56] References Cited

U.S. PATENT DOCUMENTS

| 4,414,754 | 11/1983 | Lapeyre | 33/707 |
| 4,486,891 | 12/1984 | Kimoto et al. | 377/24 |
| 4,628,521 | 12/1986 | Nishimura et al. | 377/24 |
| 4,654,527 | 3/1987 | Schmitt | 33/707 |
| 4,793,067 | 12/1988 | Reimar et al. | 33/707 |
| 4,897,647 | 1/1990 | Sakamoto et al. | 377/17 |
| 5,027,526 | 7/1991 | Crane | 33/755 |
| 5,058,145 | 10/1991 | Hauck et al. | 377/17 |

Primary Examiner—John S. Heyman
Attorney, Agent, or Firm—Oblon, Spivak, McClelland, Maier & Neustadt

[57] ABSTRACT

A linear scale measuring device of the absolute type capable of exhibiting high resolution and accomplishing the measuring operation with high accuracy. In the device, A cycle of indented lines for increment data is set to be twice as large as that of indented lines for absolute data. Also provided is an absolute data detection section which detects absolute data values corresponding to the indented lines, and a data converter which converts an output of the absolute data detection section into a digital signal. An operation section which includes a computing element adds either +1 to −1 to the digital signal output from the data converter, or does not add to the digital signal, in accordance with an output signal from an interpolation section.

2 Claims, 3 Drawing Sheets

LINEAR SCALE MEASURING DEVICE

BACKGROUND OF THE INVENTION

This invention relates to a linear scale measuring device for determining the amount of relative movement between two objects, and more particularly to a linear scale measuring device of the absolute type which is adapted to exhibit a correcting function with high accuracy.

In a machine tool or the like, it is highly important to accurately grasp or determine the amount of relative movement of a tool to a work. Also, in an industrial recorder other than a machine tool, accurate controlling of movement of a recording head relative to a record medium depending upon an signal input to the recorder requires to precisely measure the amount of relative movement between both.

In view of the foregoing, measuring systems of various types have been conventionally proposed as a means for measuring the amount of movement between two objects which are moved relative to each other. The proposed measuring systems are generally classified into an increment type for determining a relative value and an absolute type.

The increment type measuring system is adapted to measure the amount of relative movement between two objects or the relative position therebetween by means of a plurality of linear indented lines (increment data) formed in parallel with one another on a glass scale. Thus, the increment type measuring system fails to detect the absolute position of each of both objects, therefore, the absolute type measuring system is substituted for the increment type one when it is required to detect the absolute position.

The absolute type measuring system is adapted to detect absolute data (absolute value code) formed on a glass scale wherein the absolute positions are represented by several bits, so that the absolute data are detected to measure the absolute positions. The absolute type measuring system has been widely used in a rotary encoder and the like.

The absolute type measuring system, as described above, can measure the absolute position corresponding to the scale.

However, the conventional absolute type measuring system or device requires to increase the dimensions of the indented lines in view of the size of a detector, an error in assembling of the device and the like, so that it fails to be used for a measuring device which is required to exhibit high resolution necessary to measure a microdistance.

SUMMARY OF THE INVENTION

The present invention has been made in view of the foregoing disadvantage of the prior art.

Accordingly, it is an object of the present invention to provide a linear scale measuring device of the absolute type which is capable of exhibiting high resolution and accomplishing the measuring with high accuracy.

It is another object of the present invention to provide a linear scale measuring device according to a combination of the absolute type and increment type.

In accordance with the present invention, a linear scale measuring device is provided. The linear scale measuring device includes a main scale provided with indented lines for absolute data and indented lines for first increment data. The indented lines for first increment data are formed at a cycle n times (n: integer) as large as a cycle of the indented lines for absolute data. The linear scale measuring device also includes an absolute data detection section arranged so as to correspond to the indented lines for absolute data, a data conversion section for converting an output signal of the absolute data detection section into a digital signal, a first increment data detection section arranged so as to the indented lines for first increment data, an interpolation section for interpolating a signal from the first increment data detection section, an operation section for adding +1 or −1 to the digital signal from the data conversion section or neglecting the adding depending upon a value of an output signal of the interpolation section, and a synthesizer section for synthesizing an output signal of the operation section and the output signal of the interpolation section.

Also, the present invention may be constructed in such a manner that indented lines for second increment data may be provided on the main scale and a second increment data detection section is arranged so as to correspond to the indented lines for second increment data.

In the linear scale measuring device of the present invention constructed as described above, the operation section carries out addition of +1 or −1 to the digital signal or neglects the addition depending upon the value of the output of the interpolation section, so that the absolute data detection section and increment data detection section may be synchronized, to thereby permit an error in measuring to be accurately corrected. Also, the synthesizer section synthesizes upper bits and lower bits obtained in the interpolation section, so that the increment data may be interpolated into the absolute data, resulting in the absolute data exhibiting high resolution.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENT

Now, a linear scale measuring device according to the present invention will be described hereinafter with reference to the accompanying drawings.

Figure 1:
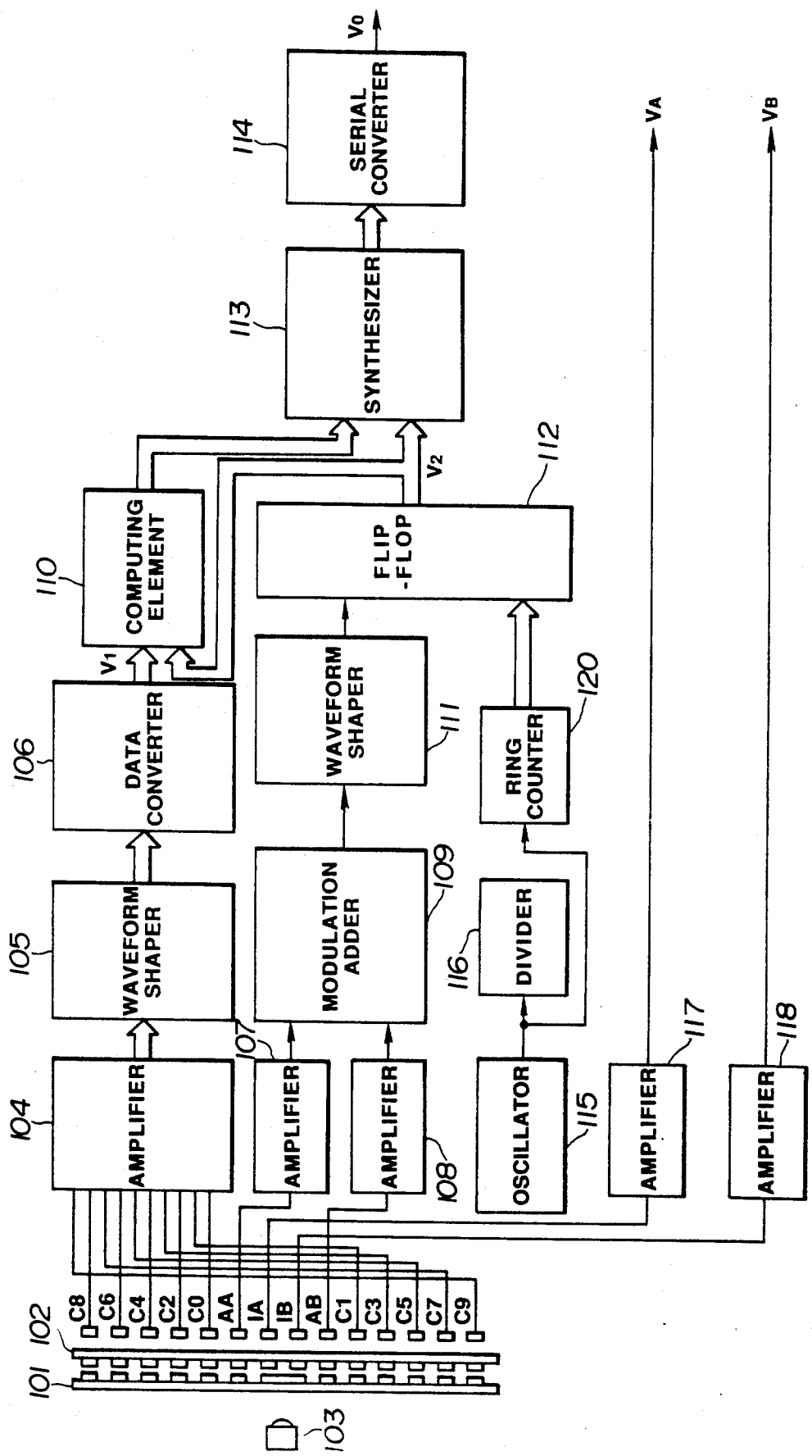
FIG. 1 is a block diagram showing an embodiment of a linear scale measuring device according to the present invention.
Figure 2:
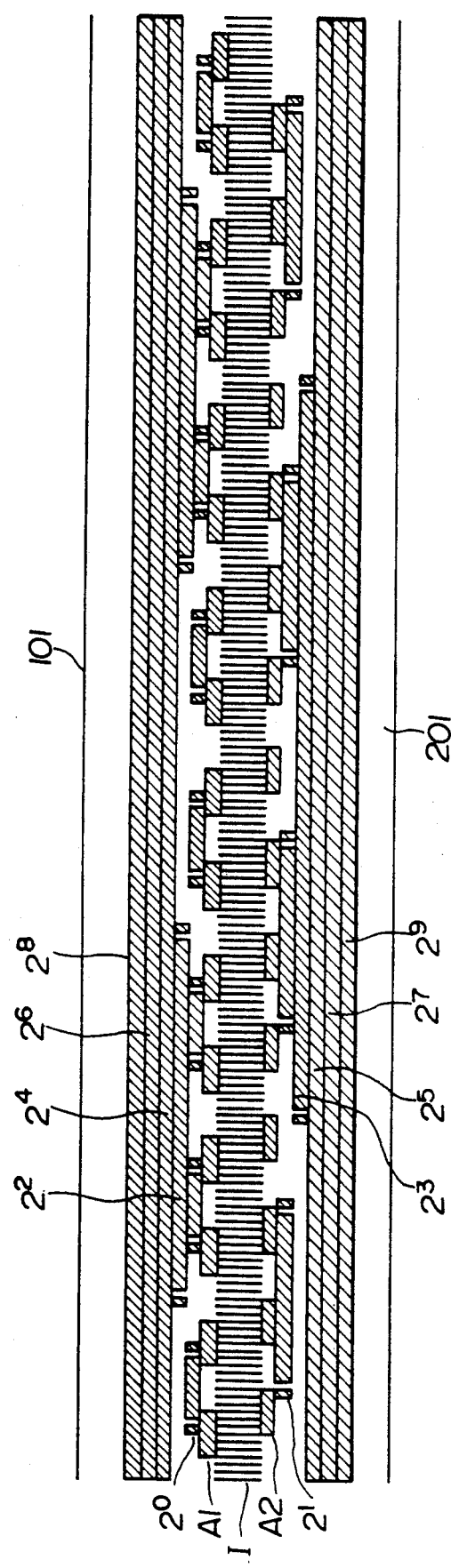
FIG. 2 is a front elevation view showing a linear scale adapted to be used in a linear scale measuring device of the present invention.
Figure 4:
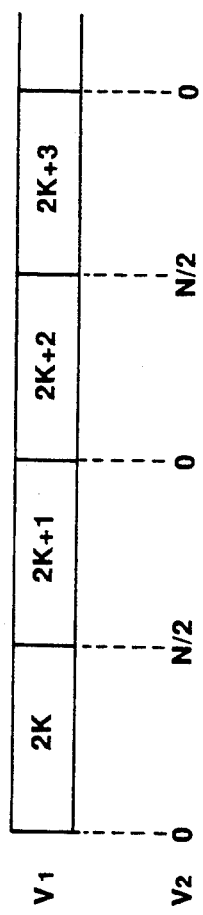
FIG. 4 is a schematic view showing the manner of operation of a linear scale measuring device of the present invention.
Figure 3:
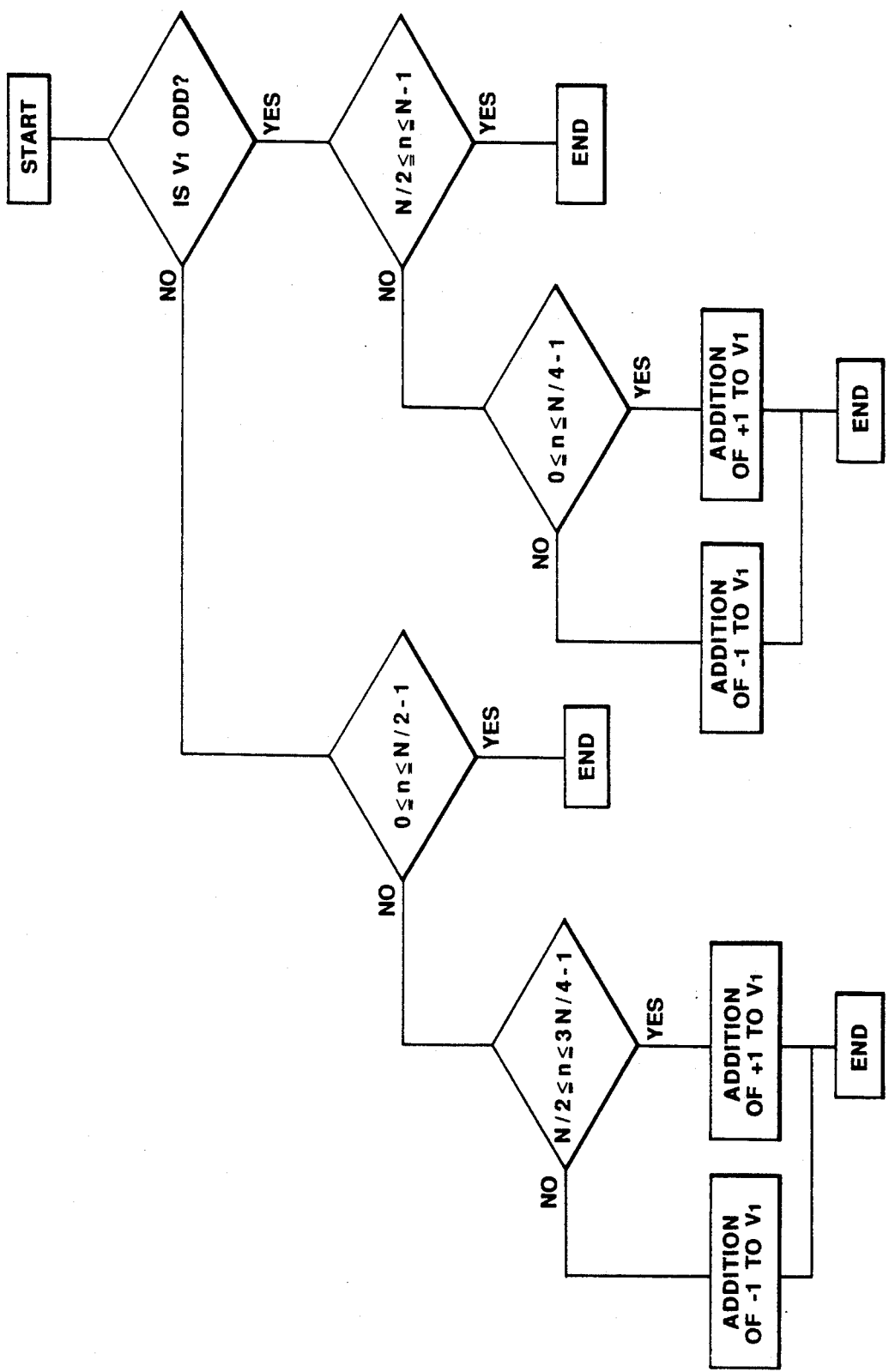
FIG. 3 is a diagrammatic view showing the manner of operation of a linear scale measuring device of the present invention.

FIGS. 1 to 3 illustrate an embodiment of a linear scale measuring device according to the present invention. A linear scale measuring device of the illustrated embodiment includes a main scale 101 provided on an elongated glass plate 201. The main scale 101, as shown in FIG. 2. includes indented lines $2^0$ to $2^9$ formed on the glass plate 201 so as to represent absolute position data or absolute data. Also, on the glass scale 101 are formed indented lines A1 and A2 and indented lines I at cycles twice as large as that of the indented lines $2^0$ to $2^9$ so as to represent first increment data and second increment data for A and B phases, respectively. The indented lines $2^0$ to $2^9$ indicating the absolute data are formed of a gray code into a ten-bit construction.

The linear scale measuring device of the illustrated embodiment also includes an index scale 102 provided on a glass plate so as to be opposite to the main scale 101 on the glass plate 201. The index scale 102 includes indented lines for detection formed on the glass plate so as to be opposite to the indented lines $2^0$ to $2^9$, A1, A2 and I on the glass plate 201. The measuring device further includes a light source 103 and photo detectors AA, AB, IA, IB and C0 to C9 arranged with the mains scale 101 and index scale 102 being interposed therebetween, as shown in FIG. 1. The photo detectors AA, AB, IA, IB and C0 to C9 are arranged opposite to the respective indented lines on the main scale 101.

The light source 103, index scale 102, and photo detectors AA, AB, IA, IB and C0 to C9 are arranged in a manner to fixed relative to one another and movable relative to the main scale 101.

Signals generated by the photo detectors C0 to C9 are fed to inputs of an amplifier 104 and a signal output from the amplifier 104 is input through a waveform shaper 105 to a data converter 106. Then, the data converter 106 generates an output signal, which is then supplied to one input of a computing element 110 serving as an operation section, so that the computing element 110 generates an output signal, which is then fed to one input of a synthesizer 113.

The photo detectors AA and AB are connected through amplifiers 107 and 108 to first and second inputs of a modulation adder 109, respectively. A signal generated by the modulation adder 109 is fed through the waveform shaper 111 to a control input of a flip-flop 112. A clock signal output from an oscillator 115 is fed through a divider 116 to a third input of the modulation adder 109, as well as through a ring counter 120 to a signal input of the flip-flop 112.

A signal generated by the flip-flop 112 is fed to both the other input of the computing element 110 and the other input of the synthesizer 113. The synthesizer 113 generates an output signal $V_0$ representing absolute data, which is then output through a serial converter 114.

The above-described modulation adder 109, waveform shaper 111, flip-flop 112, oscillator 115, divider 116 and ring counter 120 cooperate with one another to form an interpolation section.

Signals from the photo-detectors IA and IB representing the A phase and B phase are respectively fed through amplifiers 117 and 118 to a counting circuit (not shown) such as an interpolation circuit or the like for the purpose of increment measuring.

Now, the manner of operation of the linear scale measuring device of the illustrated embodiment constructed as described above will be described hereinafter.

First, when the main scale 101 and index scale 102 are moved relative to each other, the photo detectors C0 to C9 generate gray code signals indicated by the indented lines $2^0$ to $2^9$. The gray code signals thus generated each are amplified through the amplifier 104, followed by being formed into a rectangular-wave shape through the waveform shaper 105. The so-formed rectangular-wave signal is converted from the gray code into a binary digital signal $V_1$ by means of the data converter 106 and then fed to the one input of the computing element 110.

Signals generated by the photo detectors AA and AB are fed through the amplifiers 107 and 108 to the first and second inputs of the modulation adder 109, respectively. The modulation adder 109 may comprise a circuit known in the art wherein an AM (Amplitude Modulation) modulator, a low pass filter and an adder are connected in series, which may be constructed and operated in such a manner as detailedly disclosed in Japanese Patent Application Laid-Open Publication No. 132104/1987. Now, the manner of operation of the modulation adder 109 will be briefly described. A clock signal of a frequency $f_0$ generated by the oscillator 115 is subjected to 1/N division through the divider 116 and then fed in the form of a carrier wave to the third input of the modulation adder 109. The modulation adder 109 functions to subject the signals from amplifiers 107 and 108 to balanced modulation by means of the signal from the divider 116 and then carry out addition of the signals, which are then input to the waveform shaper 111. When an A phase signal and a B phase signal are represented by $E_1\sin(2\pi x/p)$ and $E_1\cos(2\#x/p)$, respectively, and carrier waves for the A and B phases are expressed by $E_2\sin\omega t$ and $E_2\cos\omega t$, respectively; the signal S generated by the modulation adder 109 can be represented by an expression $S=K\cos(\omega t-2\#x/p)$, wherein $K=E_1E_2/2$, x indicates the amount of relative movement and p indicates a pitch of moire fringe. Thus, the signal S contains the amount of relative movement x as a phase component thereof, so that the phase of the signal S is varied depending upon the amount of relative movement The waveform shaper 111 acts to convert the signal S into a rectangular wave and supply it to the control input of the flip-flop 112.

The oscillator 115 generates a clock signal, which is then counted by the ring counter 120. A value of the clock signal counted by the ring counter 120 is fed in the form of a binary digital signal to the flip-flop 112. The ring counter 120 is set to count the clock signal, resulting in successively repeatedly generating binary digital signals having values of 0 to (N−1). The value (N−1) corresponds to the pitch of the indented lines A1 and A2 and therefore two times as long as the pitch of the indented lines $2_0$ to $2_9$. The flip-flop 112 responds to the leading edge of the signal output from the waveform shaper 111, to thereby output, as a signal $V_2$, the signal input thereto from the ring counter 120. When the main scale 101 and index scale 102 are moved relative to each other, the phase of the signal S and therefore the position of leading edge of the output signal of the waveform shaper are varied. Thus, the binary digital signal $V_2$ corresponding to the phase change is output as a lower bit signal from the flip-flop 112 within the range between 0 and (N−1). The lower bit signal corresponds to a signal in which absolute data are interpolated.

As described above, the cycle of the indented lines A1 and A2 for the first increment data is set to be twice as large as that of the indented lines $2^0$ to $2^9$ for the absolute data, so that the signal $V_2$ is caused to have a value between 0 and (N/2−1) when the signal $V_1$ is even and have a value of from N/2 to (N−1) when the signal $V_1$ is odd. Unfortunately, there is a possibility that the signals $V_1$ and $V_2$ fail to establish the above-described relationship therebetween due to a cause such as a variation in propagation delay in the amplifiers 104, 107 and 108, waveform shapers 105 and 111, data converter 106, flip-flop 112 and the like, leading to any error in measuring. In order to correct the error, the computing element 110 is adapted to carry out such processing as shown in FIG. 3.

More particularly, first of all, the computing element 110 judges whether the signal $V_1$ is odd. When the signal is odd, the computing element 110 carries out the following processing.

When the signal $V_2$ is between $N/2$ and $N-1$ ($N/2 \leq$ signal $V_2 \leq N-1$), the computing element 110 judges that the relationship between the signals $V_1$ and $V_2$ is normal or there does not occur any error in measuring; so that addition processing does not take place. When the signal $V_2$ is between 0 and $N/4-1$ ($0 \leq$ signal $V_2 \leq N/4-1$), $+1$ is added to the signal $V_1$; whereas, when it is not within the range, $-1$ is added to the signal $V_1$. Thus, the correction of the signal $V_1$ takes place to permit the signals $V_1$ and $V_2$ to meet the above-described relationship, on the assumption that the error is in a micro amount.

When the signal $V_1$ is even, the following processing takes place.

When the signal $V_2$ is between 0 and $N/2-1$ ($0 \leq$ signal $V_2 \leq N/2-1$), the computing element 110 judges that the relationship between the signals $V_1$ and $V_2$ is normal or there does not occur any error in measuring; so that addition processing does not take place. When the signal $V_2$ is between $N/2$ and $3N/4-1$ ($N/2 \leq$ signal $V_2 \leq 3N/4-1$), $+1$ is added to the signal $V_1$; whereas, when it deviates from the range, $-1$ is added to the signal $V_1$.

The above-described operation results in the relationship between the signal $V_1$ and the signal $V_2$ being rendered appropriate, leading to correction of the error.

Following the above-described processing by the computing element 110, the signal processed is fed as an upper bit digital signal to the one input of the synthesizer 113. The synthesizer 113 synthesizes the upper bit digital signal and lower bit digital signal fed to both inputs thereof, to thereby form a single digital signal.

The illustrated embodiment, as described above, is constructed in the manner that the cycle of the indented lines A1 and A2 for the increment data is set to be twice as large as that of the indented lines $2^0$ to $2^9$ for the absolute data, so that the uppermost one of the lower bits is decreased by one digit as compared with the lowermost one of the upper bits. Therefore, a series of digital signals can be formed by merely synthesizing the upper bits and lower bits. For example, the upper bits are represented by $X_1 X_2 x_n$ and the lower bits are represented by $Y_1 Y_2 \cdots Y_n$, the digital signals obtained are represented by $X_1 X_2 \cdots X_n Y_1 Y_2 \cdots Y_n$. The digital signal correspond to the sum of rough data based on the absolute data and data of high resolution interpolating between the absolute data, resulting in the absolute data being permitted to have increased resolution. The digital signal is then converted into a serial signal through the serial converter 114, followed by being output as an output signal $V_0$.

When only the increment measuring is carried out, the A phase signal from the photo detector IA and the B phase signal from the photo detector IB are amplified through the amplifiers 117 and 118, respectively. Thus, the increment measuring can be accomplished at high resolution through any suitable interpolation circuit (not shown) known in the art such as a circuit as disclosed in Japanese Patent Application Laid-Open Publication No. 132104/1987.

In the illustrated embodiment, the cycle of the indented lines for the first increment data is set to be twice as large as that of the indented lines for the absolute data. However, the former may be set to be n times (n: integer) as large as the latter.

As can be seen from the foregoing, the linear scale measuring deice of the present invention can provide a linear scale measuring device of the absolute type which carries out the measuring operation with high accuracy while being free of any error in measuring. Also, the present invention can provide a linear scale measuring device according to a combination of the absolute type and increment type.

While a preferred embodiment of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A linear scale measuring device comprising:
   a main scale provided with indented lines for absolute data and indented lines for first increment data;
   said indented lines for first increment data being formed at a cycle n times (n: integer) as large as a cycle of said indented lines for absolute data;
   an absolute data detection section arranged so as to correspond to said indented lines for absolute data;
   a data conversion section for converting an output signal of said absolute data detection section into a digital signal;
   a first increment data detection section arranged so as to said indented lines for first increment data;
   an interpolation section for interpolating a signal from said first increment data detection section;
   an operation section for adding $+1$ or $-1$ to the digital signal from said data conversion section or neglecting said adding depending upon a value of an output signal of said interpolation section; and
   a synthesizer section for synthesizing an output signal of said operation section and the output signal of said interpolation section.

2. A linear scale measuring device as defined in claim 1, further comprising indented lines for second increment data provided on said main scale and a second increment data detection section arranged so as to correspond to said indented lines for second increment data.

* * * * *